(12) United States Patent
Nolle et al.

(10) Patent No.: US 8,788,647 B1
(45) Date of Patent: Jul. 22, 2014

(54) LOAD BALANCING FOR NETWORK DEVICES

(75) Inventors: Steven Paul Nolle, Naperville, IL (US); Brian Jay Barker, Naperville, IL (US); Keith Olsen, Glen Ellyn, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 156 days.

(21) Appl. No.: 13/097,401

(22) Filed: Apr. 29, 2011

Related U.S. Application Data (60) Provisional application No. 61/329,418, filed on Apr. 29, 2010.

(51) Int. Cl.
*G06F 15/173* (2006.01)
*G06F 11/00* (2006.01)
*H04L 12/28* (2006.01)
*H04L 5/16* (2006.01)
*G06F 13/00* (2006.01)

(52) U.S. Cl.
USPC ........... 709/223; 370/230; 370/431; 375/222; 710/300

(58) Field of Classification Search
USPC ............ 709/223–229; 710/38, 200; 370/230, 370/431; 375/222
See application file for complete search history.

(56) References Cited

U.S. PATENT DOCUMENTS

| | | | | | |
|---|---|---|---|---|---|
| 4,435,755 | A | * | 3/1984 | Meritt | 710/38 |
| 7,068,597 | B1 | * | 6/2006 | Fijolek et al. | 370/230 |
| 7,441,061 | B2 | * | 10/2008 | Gilligan | 710/300 |
| 2006/0251097 | A1 | * | 11/2006 | Chapman et al. | 370/431 |
| 2009/0122846 | A1 | * | 5/2009 | Kolze et al. | 375/222 |

\* cited by examiner

*Primary Examiner* — Jung Park
*Assistant Examiner* — Chuong M Nguyen
(74) *Attorney, Agent, or Firm* — Troy A. Van Aacken (57) ABSTRACT

Systems and methods can be operable to provide improved load balancing for network devices. In some implementations, such systems and methods can operate to create success list and/or fail list for use in optimizing improved load balancing for network devices. In other implementations, such systems and methods can also operate to manage and remove entries from success list and/or fail list. The success list and/or fail list can be used to optimize load balancing thereby reducing or preventing interruption in service to customers.

20 Claims, 8 Drawing Sheets

LOAD BALANCING FOR NETWORK DEVICES

CROSS REFERENCE TO RELATED APPLICATIONS

This application claims priority to the benefit of the filing date of Crisp, U.S. Provisional Patent Application No. 61/329,418 entitled "Improved Load Balancing for Network Devices," which was filed Apr. 29, 2010, and is incorporated herein by reference in its entirety.

TECHNICAL FIELD

This disclosure relates to improved load balancing for network devices.

BACKGROUND

The Data-Over-Cable Service Interface Specification (DOCSIS) was established by cable television network operators to facilitate transporting data packets, primarily internet packets, over existing community antenna television (CATV) networks. In addition to transporting data packets, as well as television content signals over a CATV network, multiple services operators (MSO) also use their CATV network infrastructure for carrying voice, video on demand (VoD) and video conferencing packet signals, among other types.

Broadband services can be delivered via existing cable infrastructure from MSOs, digital subscriber lines (xDSL), integrated service digital network (ISDN), public switched phone networks, or T1 connections from telecommunications operators or internet service providers, satellite from satellite operators, or wireless services (such as, e.g., cellular, 802.11 or Wi-MAX standards) from wireless service providers, among many others. The growth of broadband CPE devices such as, for example, cable modems (CMs) and multimedia terminal adapters (MTAs) has expanded traditional data services to provide additional functionality such as, for example, voice over internet protocol (VoIP) telephony service in a single integrated device.

In an effort to balance the downstream and upstream channels from a cable modem termination system (CMTS), CMs/MTAs can be directed to change from heavier loaded channels to lighter loaded channels. CMs/MTAs can be moved to other channels following an initial range request following the registration process or during normal operations. During a balancing process, CMs/MTAs can fail to move to a new channel due to problems with the CMs/MTAs or due to plant issues making the new channels unusable. Failures can be transient or can indicate a persistent plant or CM/MTA problem. However, when a CM/MTA fails to move to the new channel it can cause an interruption in service to the customer. Moreover, if many CMs/MTAs fail to register on the new channel, then resulting load imbalances can compound failures and thus cause additional customer service interruptions.

DETAILED DESCRIPTION

In some implementations of this disclosure, systems and methods can operate to provide load balancing for network devices (e.g., including a cable modem). In some implementations, a CMTS can provide improved load balancing for network devices by detecting and recording successful and failed load balancing attempts following a CM/MTA registration. In other implementations, a CMTS can provide improved cable modem load balancing by detecting and recording successful and failed load balancing attempts during normal operations. Using a success list and/or fail list, the CM can reduce attempts to rebalance a CM/MTA that has previously failed transfer to another channel. For example, a CMTS can traverse a fail list prior to instructing a CM/MTA to move from a channel in a high-load balance group to a channel in a low-load balance group. If the CM/MTA is on a fail list for that channel, then the CMTS can skip transfer of that CM/MTA and attempt to move another CM/MTA in the high-load balance group.

Some implementations of systems and methods can operate to manage and remove entries from improved load balancing for network devices a success list and/or fail list. Thus, the CMTS can manage and remove success/fail lists entries based upon stored CM/MTA success counts and/or fail counts. Moreover, a CM/MTA success count and/or fail count can be used to categorize the CM/MTA into different classes based upon ratios of successes and failures.

In other implementations, improved cable model load balancing can manage and remove success/fail lists entries based upon a timestamp and/or age-out timer. For example, entries that can be present on the success/fail lists for a specified duration can be removed once the age-out time has expired. In addition, an age-out timer can be used in conjunction with success/fail counts to manage and remove success/fail lists entries.

In still further implementations, improved cable model load balancing can manage and remove success/fail lists entries based upon an exclude-count-threshold. In some implementations, an exclude-count-threshold can be a programmable value. In other implementations, an exclude-count-threshold can be a dynamic value that changes based upon other system factors. For example, if a CM/MTA has exceeded a number of failed attempts during improved load balancing for network devices, then the CM/MTA cannot be considered for subsequent load balancing attempts. In addition, an exclude-count-threshold can be used in conjunction with an age-out timer and/or success/failure counts to manage and remove success/fail lists entries.

Figure 1:
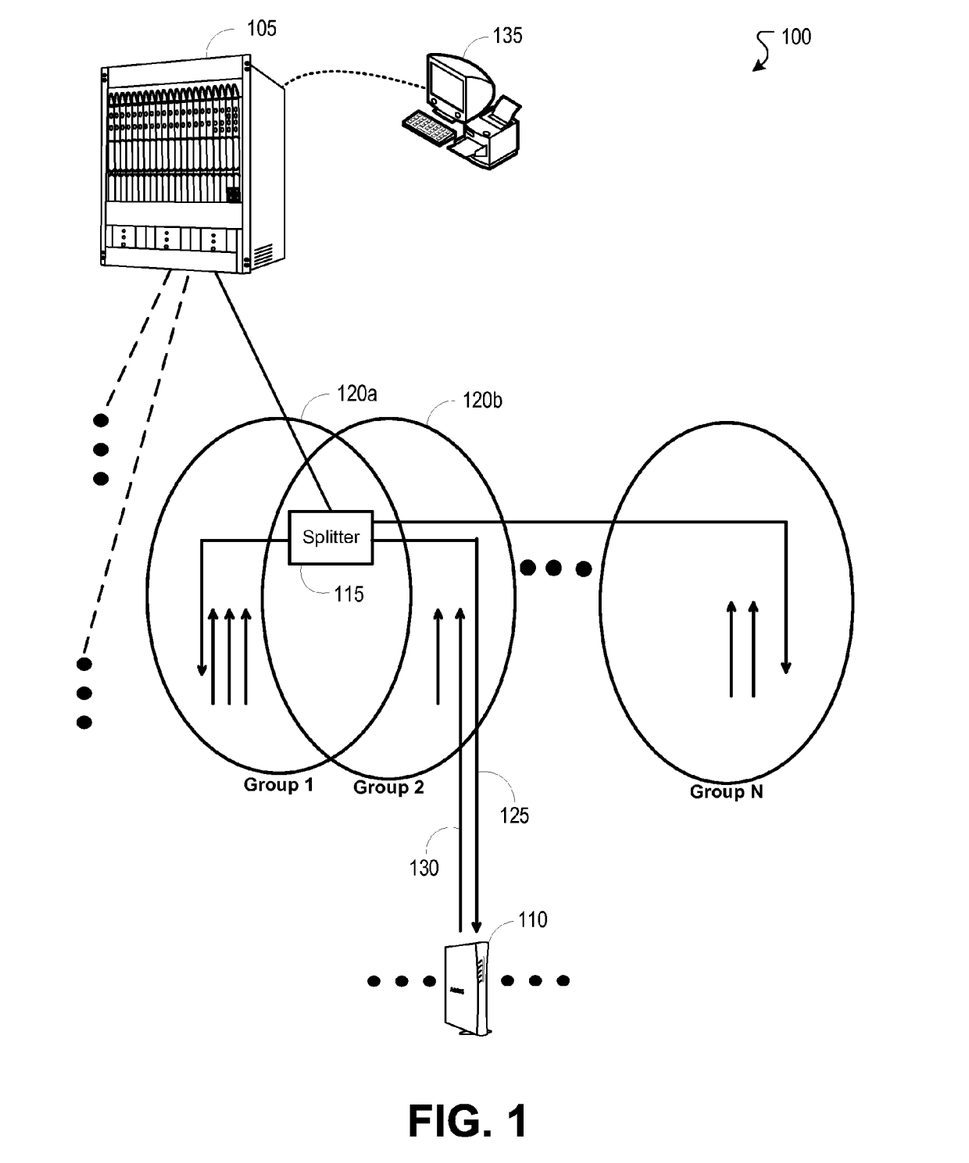
FIG. 1 is a block diagram illustrating an example network environment operable to provide improved load balancing for network devices.

FIG. 1 is a block diagram illustrating an example network environment operable to provide improved load balancing for network devices. In some implementations, a CMTS 105 can provide video, data, and/or voice service(s) to users at the CM/MTA 110. The CMTS can attach to one or more devices to distribute signals and load balancing information such as, for example, a splitter 115. The splitter 115 can further segment into multiple load groups 120*a-b* such as, for example, Group 1 120*a* and Group 2 120*b*. An individual load group 120*a-b* can include one or more downstream 125 and/or upstream 130 channels. The downstream channels 125 can provide video, data, and/or voice service(s) from the CMTS 105 to users at the CM/MTA 110. The upstream channels 130 can provide video, data, and/or voice service(s) from the users at the CM/MTA 110 to the CMTS 105. Moreover, a computing device 135 can be used to store and/or manage load balancing data. It should be understood that a computing device 135 can be an optional component to implement improved cable model load balancing.

The CMTS 105 and/or a computing device 135 connected to the CMTS can perform load balancing for network devices by assigning CM/MTA 110 to downstream 125 and/or upstream 130 channels to optimize performance. For example, if the downstream channels in Group 1 120*a* are operating at maximum capacity while downstream channels in Group 2 120*b* are operating in at a low capacity, then load balancing for network devices can reassign one or more CM/MTA 110 in one channel in Group 1 120*a* to a channel in Group 2 120*b*. The reassignment of a CM/MTA 110 can sometimes result in a failure of a specific CM/MTA 110 to move channel groups thereby resulting in an interruption of service to the user. Moreover, if the failure results in a low-load channel, the selected channel might be more likely to be chosen for additional channel assignments thereby exacerbating the problem of load balancing and reducing optimal service.

The improved load balancing for network devices can be implemented at the CMTS 105 and/or a computing device 135 communicating with the CMTS 105. Moreover, the improved cable model load balancing can manage a success list and/or fail list to reduce problems associated with traditional load balancing for network devices. In some implementations, all or part of the improved load balancing for network devices can be performed in a CAM (cable access module). In other implementations, all or part of the improved load balancing for network devices can be performed in another part of the CMTS 105. In still further implementations, all or part of the improved load balancing for network devices can be performed in another computing device 135 attached to the CMTS 105. However, it should be understood that the computing device 135 is not necessary to implement improved load balancing for network devices.

Figure 2:
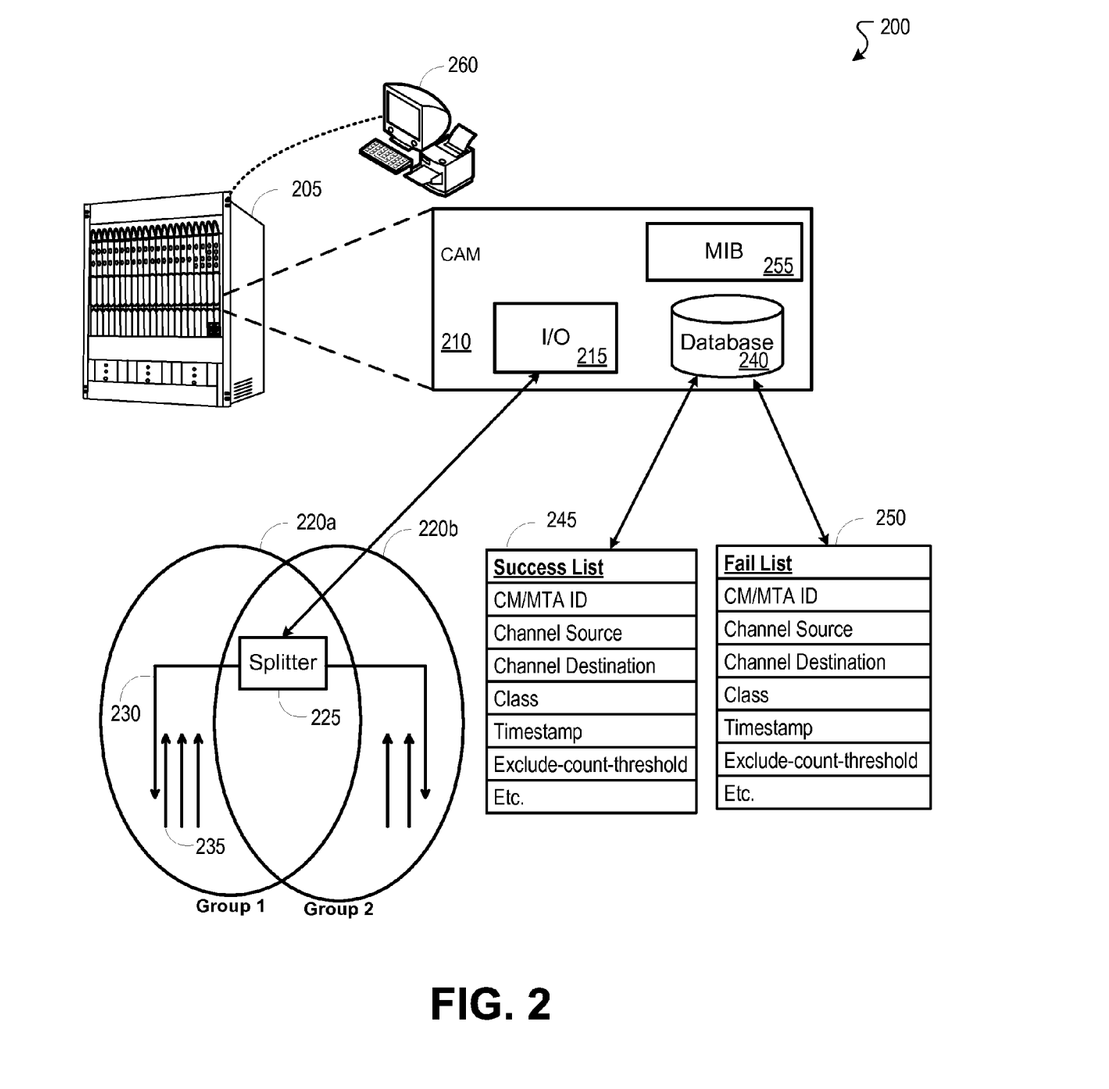
FIG. 2 is a block diagram illustrating an example CMTS device operable to provide improved load balancing for network devices.

FIG. 2 is a block diagram illustrating an example CMTS device operable to provide load balancing for network devices. The CMTS 205 (e.g., CMTS 105 of FIG. 1) can include a CAM 210 operable to provide improved cable model load balancing. The CAM 210 can store, process, and/or communicate instructions to implement improved cable model load balancing. The CAM 210 can include an I/O module 215 that communicates with load balance groups 220*a-b* (e.g., load balance groups 120*a-b* of FIG. 1) through a splitter 225 (e.g., splitter 115 of FIG. 1). The splitter distributes and receives content in downstream channels 230 (e.g., downstream channel 125 of FIG. 1) and upstream channels 235 (e.g., upstream channel 130 of FIG. 1) to end users at a CM/MTA (e.g., CM/MTA 110 of FIG. 1).

The CAM 210 can also include a database 240 operable to store and retrieve a success list 245 and/or fail list 250. The success list 245 and/or fail list 250 can operate to implement improved load balancing for network devices by storing network/device characteristics such as, for example, a CM/MTA ID, a channel source, a channel destination, a class, a timestamp, an exclude-threshold count, among other elements. In some implementations, the success list 245 and/or fail list 250 can be a text file comprised of ASCII text characters. In other implementations, the success list 245 and/or fail list 250 can be another file format that represents respective network/device characteristics.

The CAM 210 can also include one or more management information base (MIB) objects 255 to record and store network/device characteristics operable to implement improved load balancing for network devices. The MIB object(s) 255 can operate to implement improved load balancing for network devices by storing network/device characteristics such as, for example, a CM/MTA ID, a channel source, a channel destination, a class, a timestamp, an exclude-threshold count, among other elements. In some implementations, the MIB object(s) 255 can be used in conjunction with the success list 245 and fail list 250 to implement improved load balancing for network devices. For example, the MIB object(s) 255 can store device characteristics and the success list 245 and fail list 250 can store network characteristics. It should be understood that other processing, computing, and/or storage elements can be present in the CAM 210 and/or the CMTS 205 to implement improved cable model load balancing.

In addition, a computing device 260 (i.e., computing device 135 of FIG. 1) can be connected to the CMTS 205. The computing device 260 can be used as a replacement for (or in conjunction with) the CAM 210 to implement improved load balancing for network devices. It should be understood that the computing device 260 is not necessary for improved load balancing for network devices. The computing device 260 can store, process, and/or communicate instructions to implement improved cable model load balancing.

Figure 3:
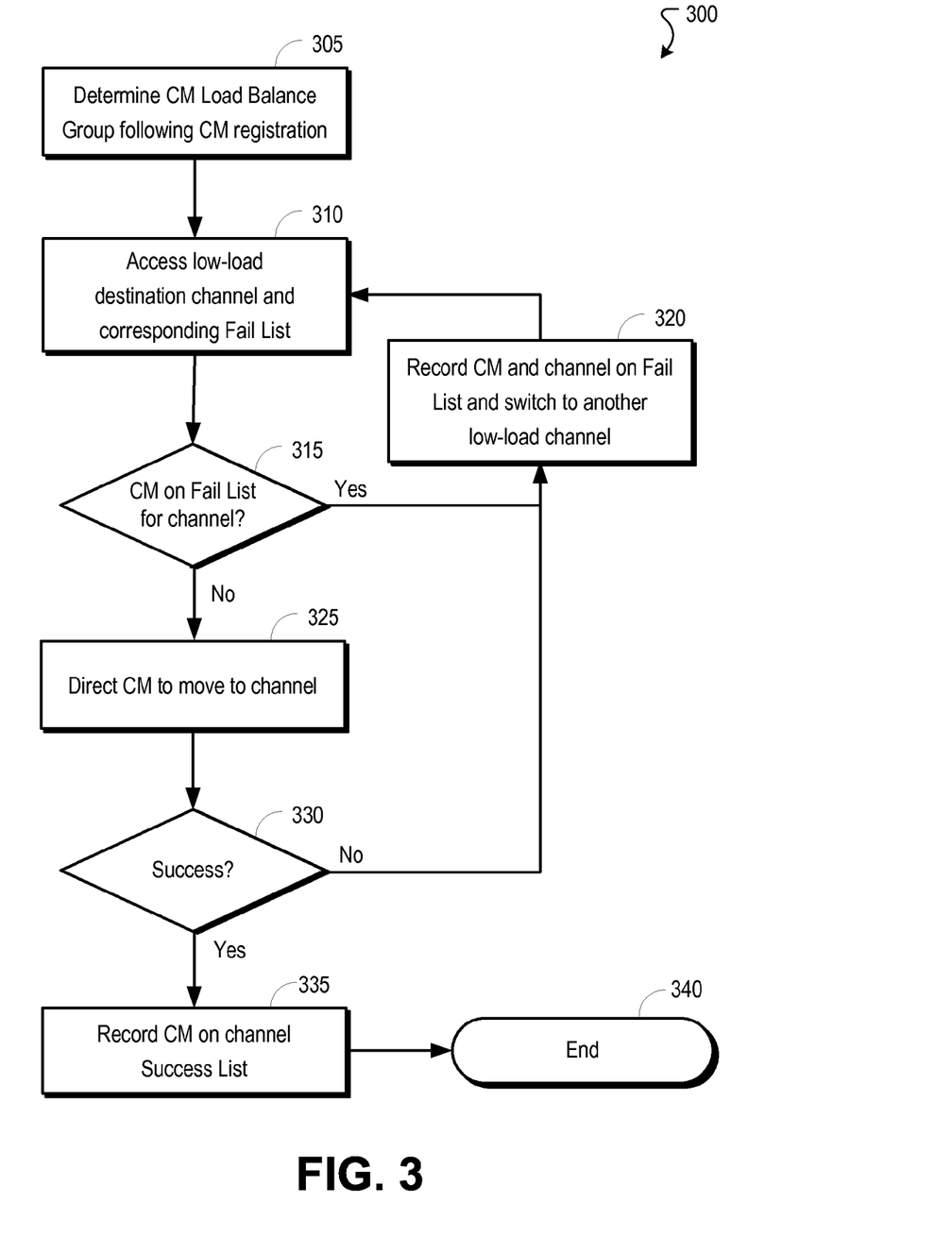
FIG. 3 is a flowchart illustrating an example process operable to provide improved load balancing for network devices for a CM device following registration.

FIG. 3 is a flowchart illustrating an example process operable to provide improved load balancing for network devices for a CM device following registration. The process 300 begins at stage 305 when a CM can be assigned to a load balance group following registration. The assignment of a load balance group (e.g., load balance group 120*a-b* of FIG. 1 and 220*a-b* of FIG. 2) can be performed by a CMTS CAM (e.g., CAM 210 of FIG. 2) and/or a load balance computing device (e.g., computing device 135 of FIG. 1 and 260 of FIG. 2). In some implementations, the assignment can be performed by the CMTS CAM in conjunction with the load balance computing device. In other implementations, an individual (e.g., a network administrator) or another device can perform the load balancing assignment. In still further implementations, the assignment can be made in a random manner. It should be understood that the CM can be a cable modem, an MTA, or another networked device implementing load balancing.

At stage 310, the device implementing improved load balancing for network devices accesses a low-load destination channel and corresponding fail list. The device accessing low-load destination channel and corresponding fail list (e.g., fail list 250 of FIG. 2) can be the CMTS CAM (e.g., CAM 210 of FIG. 2) and/or the computing device (e.g., computing device 135 of FIG. 1 and 260 of FIG. 2). The low-load destination channel can be identified from various methods such as, for example, a table lookup or a polling of available channels within a group. In some implementations, a success list can be used instead of (or in conjunction with) the fail list.

In other implementations, a low-load channel might not necessarily be selected for initial channel assignment.

At stage 315, a determination can be made whether the CM being assigned is on the fail list for the destination channel. The determination can be made, for example, by the CMTS CAM (e.g., CAM 210 of FIG. 2) and/or the computing device (e.g., computing device 135 of FIG. 1 and 260 of FIG. 2). In some implementations, determination can be made using the fail list. In other implementations, the determination can be made using the success list. In still further implementations, the determination can be made by comparing values stored in the MIB counters.

If the CM is on the fail list for the destination channel at stage 315, then at stage 320 the CM can be recorded on the fail list for the destination channel, another low-load channel can be selected, and the process 300 returns to stage 310 for a comparison of the new destination channel and associated fail list. The recording, selection of a new destination channel, and return to stage 310 can be accomplished, for example, by the CMTS CAM (e.g., CAM 210 of FIG. 2) and/or the computing device (e.g., computing device 135 of FIG. 1 and 260 of FIG. 2). In some implementations, the recording can provide values such as, for example, a classification value, and/or a timestamp for an age-out timer, an exclude-count threshold. In other implementations, no recordings are made and the next low-load channel can be selected as a destination for the CM. In still further implementations, another CM can be selected to assign to the same low-load channel.

If the CM is not on the fail list for the destination channel at stage 315, then at stage 325 the CM can be directed to move to the destination channel. The determination and direction of the CM to the destination channel can be accomplished by the CMTS CAM (e.g., CAM 210 of FIG. 2) and/or the computing device (e.g., computing device 135 of FIG. 1 and 260 of FIG. 2). In some implementations, the direction of CM to the destination channel move can be performed following the recording of values. In other implementations, the CM availability can be recorded without being directed to the destination channel.

At stage 330, a determination can be made whether the CM channel assignment was successful. The determination can be made, for example, by the CM (e.g., CM/MTA 110 of FIG. 1), CMTS CAM (e.g., CAM 210 of FIG. 2), and/or the computing device (e.g., computing device 135 of FIG. 1 and 260 of FIG. 2). In some implementations, determination can be made by reading registers in the CM. In other implementations, the determination can be made by a signal and/or absence of signal received from the CM. In still further implementations, the determination can be made by observing channel activity.

If the CM channel assignment is not successful at stage 330, then at stage 320 the CM can be recorded on the fail list for the destination channel, another low-load channel can be selected, and the process returns to stage 310 for a comparison of the new destination channel and associated fail list. The recording, selection of a new destination channel, and return to stage 310 can be accomplished by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, the recording can include values such as, for example, a CM identification, a channel identification, a classification value, and/or a timestamp for an age-out timer, an exclude-count threshold. In other implementations, no recordings are made and the next low-load channel can be selected as a destination for the CM.

If the CM channel assignment is successful at stage 330, then at stage 335 the CM can be recorded on the success list for the destination channel. The recording on the success list can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In various implementations, other values can be recorded. For example, the recording can include values such as a CM identification, a channel identification, a classification value, a timestamp for an age-out timer, and/or an exclude-count threshold, among many others. In other implementations, the CM is not added to a success list but instead removed from a fail list. The process ends at stage 340.

In some implementations, the CM can be a traditional stand-alone cable modem. In other implementations, the CM can be an integrated device with cable modem functionality such as, for example, an MTA or set-top box. In still further implementations, the CM can be another networked device that uses load balancing. In alternative implementations, another structure instead of success list and fail list can be used for storing values to implement improved load balancing for network devices.

Figure 4:
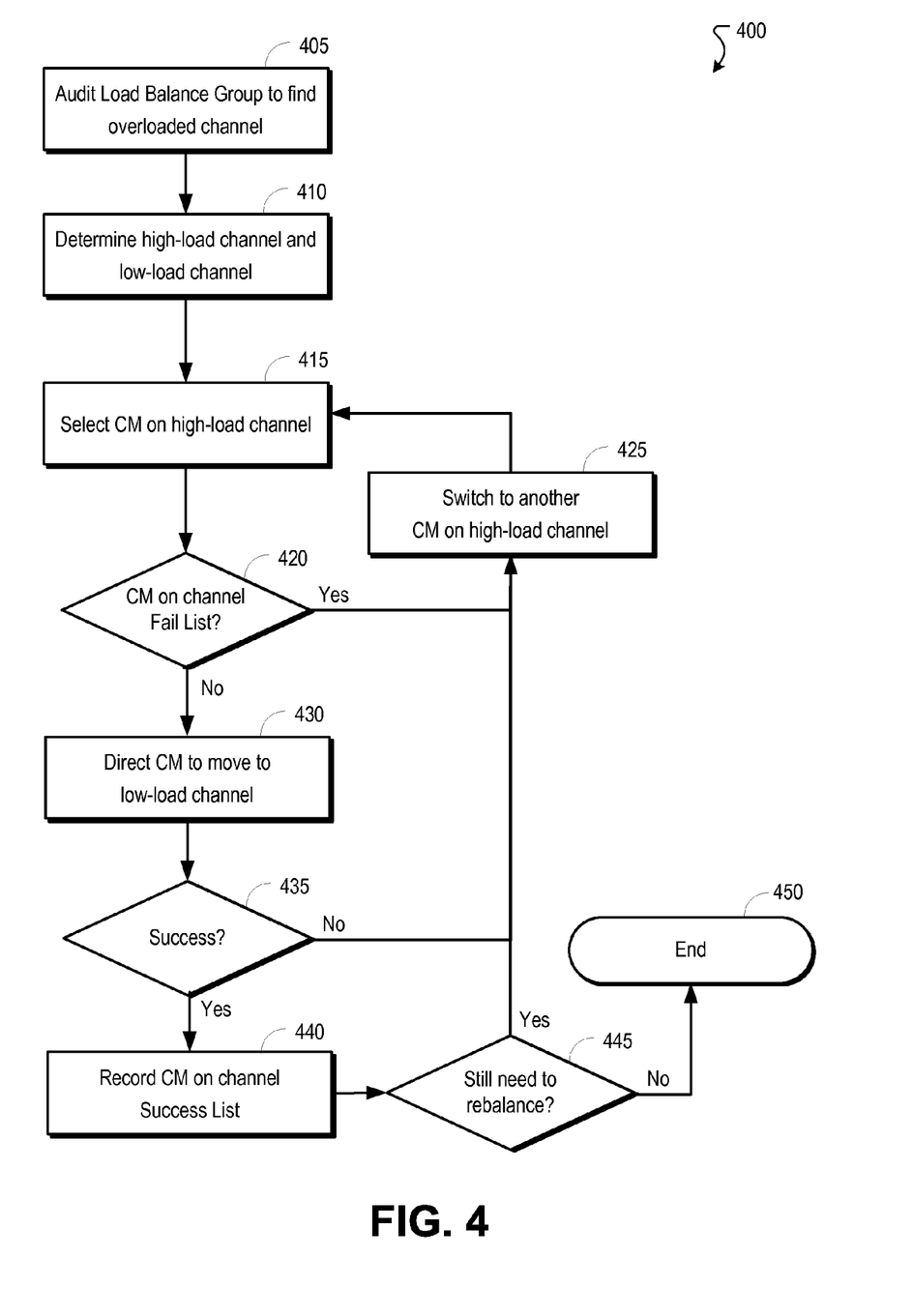
FIG. 4 is a flowchart illustrating an example process operable to provide improved load balancing for network devices for a CM device during normal operation.

FIG. 4 is a flowchart illustrating an example process operable to provide improved load balancing for network devices for a CM device during normal operation. The process 400 begins at stage 405 where an audit of a load balance group can be initiated. The audit of a load balance group (e.g., load balance group 120a-b of FIGS. 1 and 220a-b of FIG. 2) can be performed, for example, by a CMTS CAM (e.g., CAM 210 of FIG. 2) and/or a load balance computing device (e.g., computing device 135 of FIGS. 1 and 260 of FIG. 2). In some implementations, the audit can be performed by the CMTS CAM in conjunction with the load balance computing device. In other implementations, an individual or another device can perform the load balancing audit. In still further implementations, the audit can be made in a random manner. It should be understood that the CM can be a cable modem, an MTA, or can be replaced with another networked device implementing load balancing.

At stage 410, the device implementing improved load balancing for network devices identifies the high-load and low-load destination channels and corresponding fail list. The device accessing destination channels and corresponding fail list (e.g., fail list 250 of FIG. 2) can be the CMTS CAM (e.g., CAM 210 of FIG. 2) and/or the computing device (e.g., computing device 135 of FIG. 1 and 260 of FIG. 2). The destination channels can be identified from various methods such as, for example, a table lookup or a polling of available channels within a group. In some implementations, a success list can be used instead or with the fail list.

At stage 415, a CM is selected from the high-load channel from the devices currently allocated in the high-load channels. The selection of a CM (e.g., CM 110 of FIG. 1) can be made, for example, by the CMTS CAM (e.g., CAM 210 of FIG. 2) and/or the computing device (e.g., computing device 135 of FIG. 1 and 260 of FIG. 2). In some implementations, the CMTS CAM and/or computing device can select the CM based upon selection factors. Such selection factors can include, for example, CM traffic load or network characters, among others. In other implementations, the CMTS CAM and/or computing device can select the CM randomly.

At stage 420, a determination can be made whether the CM to be assigned is on the fail list for the low-load destination channel. The determination can be made, for example, by the CMTS CAM (e.g., CAM 210 of FIG. 2) and/or the computing device (e.g., computing device 135 of FIG. 1 and 260 of FIG. 2). In some implementations, determination can be made using the fail list. In other implementations, the determination can be made using the success list. In still further implementations, the determination can be made by comparing values stored in the MIB counters.

If the CM is on the fail list for the destination channel at stage 420, then at stage 425 another CM on the high-load channel can be selected, and the process returns to stage 415 for a comparison of the new CM and the low-load destination channel and associated fail list. The recording, selection of a new channel, and return to stage 415 can be accomplished, for example, by the CMTS CAM (e.g., CAM 210 of FIG. 2) and/or the computing device (e.g., computing device 135 of FIG. 1 and 260 of FIG. 2). In some implementations, the recording can include values such as, for example, a classification value, and/or a timestamp for an age-out timer, an exclude-count threshold. In other implementations, no recordings are made and the next low-load channel can be selected as a destination for the CM. In alternative implementations, the CM can be retained and another low-load destination channel can be selected.

If the CM is not on the fail list for the destination channel at stage 420, then at stage 430 the CM can be directed to move to the destination channel. The determination and direction of the CM to the destination channel can be accomplished, for example, by the CMTS CAM (e.g., CAM 210 of FIG. 2) and/or the computing device (e.g., computing device 135 of FIG. 1 and 260 of FIG. 2). In some implementations, the direction of CM to the destination channel move can be performed following the recording of values. In other implementations, the CM availability can be recorded without being directed to the destination channel.

At stage 435, a determination can be made whether the CM channel assignment was successful. The determination can be made, for example, by the CM (e.g., CM/MTA 110 of FIG. 1), CMTS CAM (e.g., CAM 210 of FIG. 2), and/or the computing device (e.g., computing device 135 of FIG. 1 and 260 of FIG. 2). In some implementations, determination can be made by reading registers in the CM. In other implementations, the determination can be made by a signal and/or absence of signal received from the CM. In still further implementations, the determination can be made by observing channel activity.

If the CM channel assignment is not successful at stage 435, then at stage 425 the CM can be recorded on the fail list for the destination channel, another high-load channel CM can be selected, and the process returns to stage 415 for a comparison of the new CM and the low-load destination channel and associated fail list. The recording, selection of a new channel, and return to stage 415 can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, the recording can include values such as, for example, a CM identification, a channel identification, a classification value, and/or a timestamp for an age-out timer, an exclude-count threshold. In other implementations, no recordings are made and the next low-load channel can be selected as a destination for the CM. In alternative implementations, the CM can be retained while another low-load destination channel can be selected.

If the CM channel assignment is successful at stage 435, then at stage 440 the CM can be recorded on the success list for the destination channel and other values can be recorded. The recording on the success list and other recorded values can be accomplished, for example, by the CM (e.g., CM/MTA 110 of FIG. 1), CMTS CAM (e.g., CAM 210 of FIG. 2) and/or the computing device (e.g., computing device 135 of FIGS. 1 and 260 of FIG. 2). In some implementations, the recording can include values such as, for example, a CM identification, a channel identification, a classification value, a timestamp for an age-out timer, and/or an exclude-count threshold, among others. In other implementations, the CM is not added to a success list but instead removed from a fail list.

At stage 445, a determination can be made whether further rebalancing is desirable. The determination can be made, for example, by the CM (e.g., CM/MTA 110 of FIG. 1), CMTS CAM (e.g., CAM 210 of FIG. 2), and/or the computing device (e.g., computing device 135 of FIG. 1 and 260 of FIG. 2). In some implementations, the determination can be made based upon load balance metrics such as, for example, a load balance threshold or load balance difference.

If it is determined to be desirable to rebalance at stage 445, then the process 400 can move to stage 425 and another high-load channel CM can be selected and then returns to stage 415 for a comparison of the newly selected CM and low-load destination channel and associated fail list. The selection of a new channel and return to stage 415 can be accomplished by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, another CM can be selected from another high-load channel and/or another low-load channel can be selected as a destination channel. If there is no need to rebalance at stage 445, then the process ends at stage 450.

In some implementations, the CM can be a traditional stand-alone cable modem. In other implementations, the CM can be an integrated device with cable modem functionality such as, for example, an MTA or set-top box. In still further implementations, the CM can be replaced by another networked device that uses load balancing over communications channels. In alternative implementations, structures other than success lists and fail lists can be used for storing values to implement improved load balancing for network devices.

Figure 5:
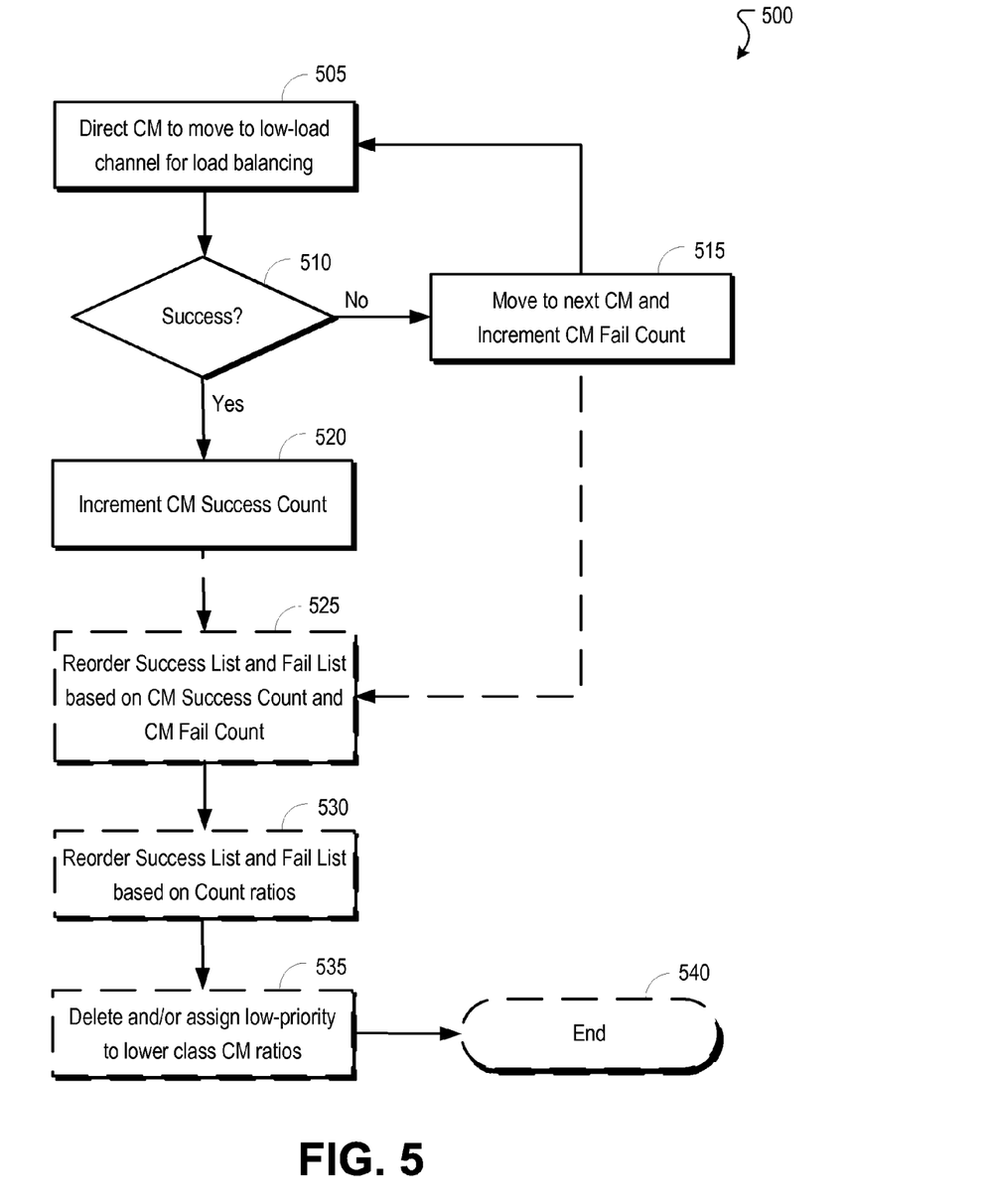
FIG. 5 is a flowchart illustrating an example process operable to provide improved load balancing for network devices list management based upon Success/Fail Counts.

FIG. 5 is a flowchart illustrating an example process operable to provide improved load balancing for network devices list management based upon success and fail counts. The process 500 begins at stage 505 when a CM can be directed to move to a channel for load balancing. The directing of the CM (e.g., CM/MTA 110 of FIG. 1) to a load balance group (e.g., load balance group 120*a-b* of FIG. 1 and 220*a-b* of FIG. 2) can be performed by a CMTS CAM (e.g., CAM 210 of FIG. 2) and/or a load balance computing device (e.g., computing device 135 of FIG. 1 and 260 of FIG. 2). In some implementations, this process can occur following initialization and/or a load balancing. In other implementations, this process can occur separately when the success list and/or fail list become large. In alternative implementations, improved load balancing for network devices management can implement one or multiple of the various processes disclosed in any combination.

At stage 510, a determination can be made whether the CM channel assignment was successful. The determination can be made, for example, by the CM (e.g., CM/MTA 110 of FIG. 1), CMTS CAM (e.g., CAM 210 of FIG. 2), and/or the computing device (e.g., computing device 135 of FIG. 1 and 260 of FIG. 2). In some implementations, determination can be made by reading registers in the CM. In other implementations, the determination can be made by a signal and/or absence of signal received from the CM. In still further implementations, the determination can be made by observing channel activity.

If the CM channel assignment is not successful at stage 510, then at stage 515 the CM can be recorded on the fail list for the destination channel, another CM can be selected, and the CM fail count can be incremented. The recording and incrementing can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, the recording can include values such as, for example, a CM identification, a channel identification, a classification value, and/or a timestamp for an age-out timer, an exclude-count threshold. In other implementations, the fail count can be a number, flag, or other message. In some implementations, the process can proceed to stage 505 where the next CM can be directed to move to another channel for load balancing.

In alternative implementations, the process can move to stage 525 for reordering of the success list and/or fail list. It should be understood the transition from stage 515 to stage 525 can be optional.

If the CM channel assignment is successful at stage 510, then at stage 520 the CM can be recorded on the success list and/or the CM success count can be incremented. The recording and incrementing can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, the recording can include values such as, for example, a CM identification, a channel identification, a classification value, and/or a timestamp for an age-out timer, an exclude-count threshold. In other implementations, the success count can be a number, flag, or other message.

At stage 525, the success list and/or fail list can be reordered based upon the success count and/or fail count. The reordering can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, reordering can be performed on a segment of the list. It should be understood the transition from stage 520 to stage 525 can be optional.

At stage 530, the success list and/or fail list can be reordered based upon the success count and/or fail count ratios. The reordering can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, the ratio can be computed by a mathematical operation. Such a mathematical operation can include, for example, a division of the success/fail count by the number of attempts. In other implementations, ratio can also contain other mathematical operations and metrics such as, for example, a success/fail count threshold value. It should be understood the transition from stage 520 to stage 530 and from stage 525 to stage 530 can be optional.

At stage 535, the success list and/or fail list can be reordered based upon the class rank. The class rank calculation can be provided, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, the class rank can be computed by using a combination of success/fail count values and/or attempts. In other implementations, class rank can also incorporate other mathematical operations and metrics such as, for example, a class threshold value. It should be understood the transition from stage 520 to stage 535, from stage 525 to stage 535, and from stage 530 to stage 535 can be optional. The process can end at stage 540.

Figure 6:
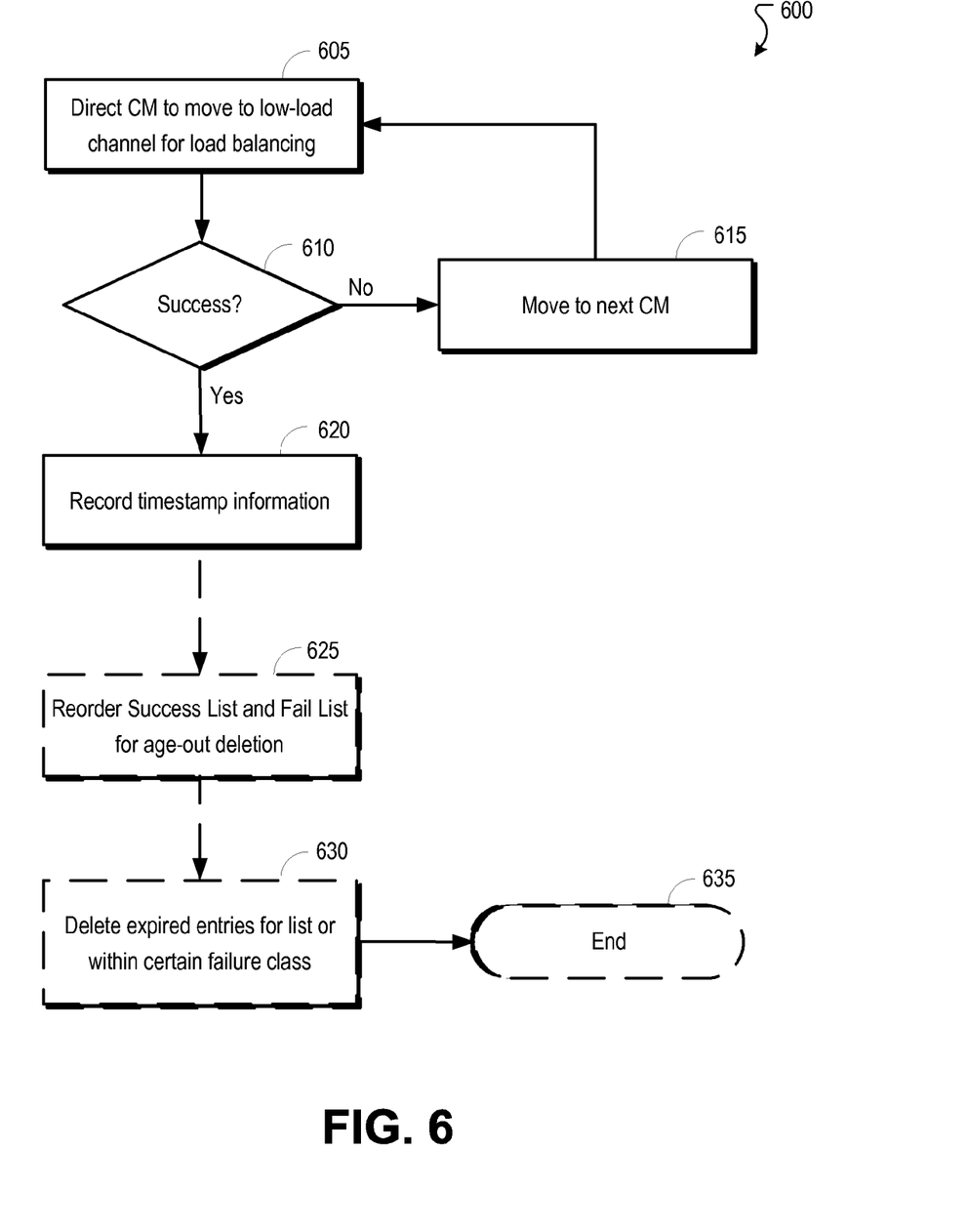
FIG. 6 is a flowchart illustrating an example process operable to provide improved load balancing for network devices list management based upon an age-out timer.

FIG. 6 is a flowchart illustrating an example process operable to provide improved load balancing for network devices list management based upon an age-out timer. The process 600 begins at stage 605 when a CM can be directed to move to a channel for load balancing. The directing of the CM (e.g., CM/MTA 110 of FIG. 1) to a load balance group (e.g., load balance group 120*a-b* of FIG. 1 and 220*a-b* of FIG. 2) can be performed, for example, by a CMTS CAM (e.g., CAM 210 of FIG. 2) and/or a load balance computing device (e.g., computing device 135 of FIG. 1 and 260 of FIG. 2). In some implementations, this process can occur following initialization and/or a load balancing. In other implementations, this process can occur separately when the Success List and/or Fail List become large. In alternative implementations, improved load balancing for network devices management can implement one or multiple of the processes disclosed in any combination.

At stage 610, a determination can be made whether the CM channel assignment was successful. The determination can be made, for example, by the CM (e.g., CM/MTA 110 of FIG. 1), CMTS CAM (e.g., CAM 210 of FIG. 2), and/or the computing device (e.g., computing device 135 of FIG. 1 and 260 of FIG. 2). In some implementations, determination can be made by reading registers in the CM. In other implementations, the determination can be made by a signal and/or absence of signal received from the CM. In still further implementations, the determination can be made by observing channel activity.

If the CM channel assignment is not successful at stage 610, then at stage 615 another CM can be selected for load balancing and the process returns to stage 605. The selection and return can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, values can be recorded for later use such as, for example, a CM identification, a channel identification, a classification value, and/or a timestamp for an age-out timer, an exclude-count threshold. In alternative implementations, another low-load channel can be selected and compared with the same CM.

If the CM channel assignment is successful at stage 610, then at stage 620 the CM timestamp can be recorded. The recording can be accomplished by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). The timestamp can be an age-out timer that can be used at a later time to remove entries from the fail list and/or success list. In some implementations, the recording can include other values such as, for example, a CM identification, a channel identification, a classification value, an exclude-count threshold.

At stage 625, the success list and/or fail list can be updated based upon the age-out timer. The updates can be accomplished by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, updates can be performed on a segment of the list. It should be understood the transition from stage 620 to stage 625 can be optional and might not occur sequentially in various disclosed processes.

At stage 630, the success list and/or fail list entries can be deleted based upon the age-out timer. The deletions can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, deletions can be based upon an age-out countdown timestamp. In other implementations, deletion can be based upon a timestamp difference. In some implementations, deletions can be performed on a segment of the list. It should be understood the transition from stage 620 to stage 630 or from stage 625 to stage 630 can be optional and might not occur sequentially in this process. The process can end at stage 635.

Figure 7:
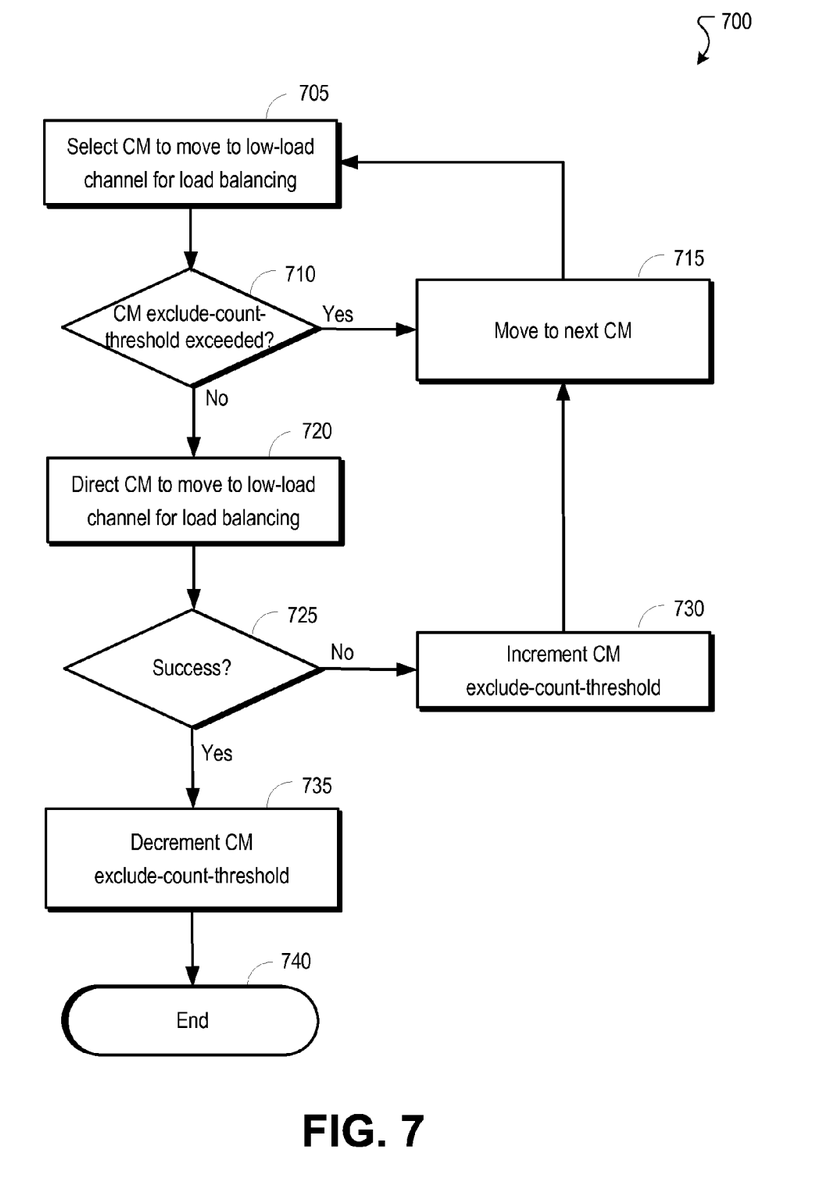
FIG. 7 is a flowchart illustrating an example process operable to provide improved load balancing for network devices list management based upon exclude-count-threshold.

FIG. 7 is a flowchart illustrating an example process operable to provide improved load balancing for network devices list management based upon exclude-count-threshold. The process 700 begins at stage 705 when a CM can be selected from devices currently allocated in a high-load channel. The selection of a CM (e.g., CM 110 of FIG. 1) can be made, for example, by the CMTS CAM (e.g., CAM 210 of FIG. 2) and/or the computing device (e.g., computing device 135 of FIG. 1 and 260 of FIG. 2). In some implementations, the CMTS CAM and/or computing device can select the CM based upon factors such as, for example, CM traffic load or network characters, among others. In other implementations, the CM CAM and/or computing device can select the CM randomly. In alternative implementations, the exclude-count-threshold can be a set value that decrements until exclusion at a pre-defined number such as, for example, zero.

At stage 710, a determination can be made whether the CM exclude-count-threshold has been exceeded. The determination can be made, for example, by the CMTS CAM (e.g., CAM 210 of FIG. 2) and/or the computing device (e.g., computing device 135 of FIG. 1 and 260 of FIG. 2). In some implementations, determination can be made using a variable in a fail list. In other implementations, the determination can be made using a variable in a success list. In still further implementations, the determination can be made by comparing values stored in the MIB counters.

If the CM exclude-count-threshold is exceeded at stage 710, then at stage 715 the CM cannot be directed to move to a low-load channel and another CM on the high-load channel can be selected, and the process returns to stage 705 for a comparison of the new CM and associated exclude-count-threshold. The selection of a new channel and return to stage 705 can be accomplished, for example, by the CMTS CAM (e.g., CAM 210 of FIG. 2) and/or the computing device (e.g., computing device 135 of FIG. 1 and 260 of FIG. 2). In some implementations, values can be stored such as, for example, a classification value and/or a timestamp for an age-out timer. In alternative implementations, the same CM can be retained and the low-load destination channel can be switched.

If the CM exclude-count-threshold is exceeded at stage 710, then at stage 720 the CM can be directed to move to the destination channel. The determination and direction of the CM to the destination channel can be accomplished, for example, by the CMTS CAM (e.g., CAM 210 of FIG. 2) and/or the computing device (e.g., computing device 135 of FIG. 1 and 260 of FIG. 2). In some implementations, the direction of CM to the destination channel move can be performed following the recording of values. In other implementations, the CM availability can be recorded without being directed to the destination channel.

At stage 725, a determination can be made whether the CM channel assignment was successful. The determination can be made, for example, by the CM (e.g., CM/MTA 110 of FIG. 1), CMTS CAM (e.g., CAM 210 of FIG. 2), and/or the computing device (e.g., computing device 135 of FIG. 1 and 260 of FIG. 2). In some implementations, determination can be made by reading registers in the CM. In other implementations, the determination can be made by a signal and/or absence of signal received from the CM. In still further implementations, the determination can be made by observing channel activity.

If the CM channel assignment is not successful at stage 725, then at stage 730 the CM exclude-count-threshold can be incremented and the process returns to stage 715 for the selection of another CM. The increment of the exclude-count-threshold and return to stage 715 can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, the increment of the exclude-count-threshold can include other recorded values such as, for example, a CM identification, a channel identification, a classification value, and/or a timestamp for an age-out timer. In other implementations, no increment is made and the next low-load channel can be selected as a destination for the CM.

If the CM channel assignment is successful at stage 725, then at stage 735 the CM exclude-count-threshold can be decremented. The decrement of the exclude-count-threshold can be accomplished, for example, by the CM (e.g., CM/MTA 110 of FIG. 1), CMTS CAM (e.g., CAM 210 of FIG. 2) and/or the computing device (e.g., computing device 135 of FIG. 1 and 260 of FIG. 2). In some implementations, the decrement can also include recording values such as, for example, a CM identification, a channel identification, a classification value, a timestamp for an age-out timer, among others. In other implementations, the CM exclude-count-threshold is not incremented. The process ends at stage 740.

Figure 8:
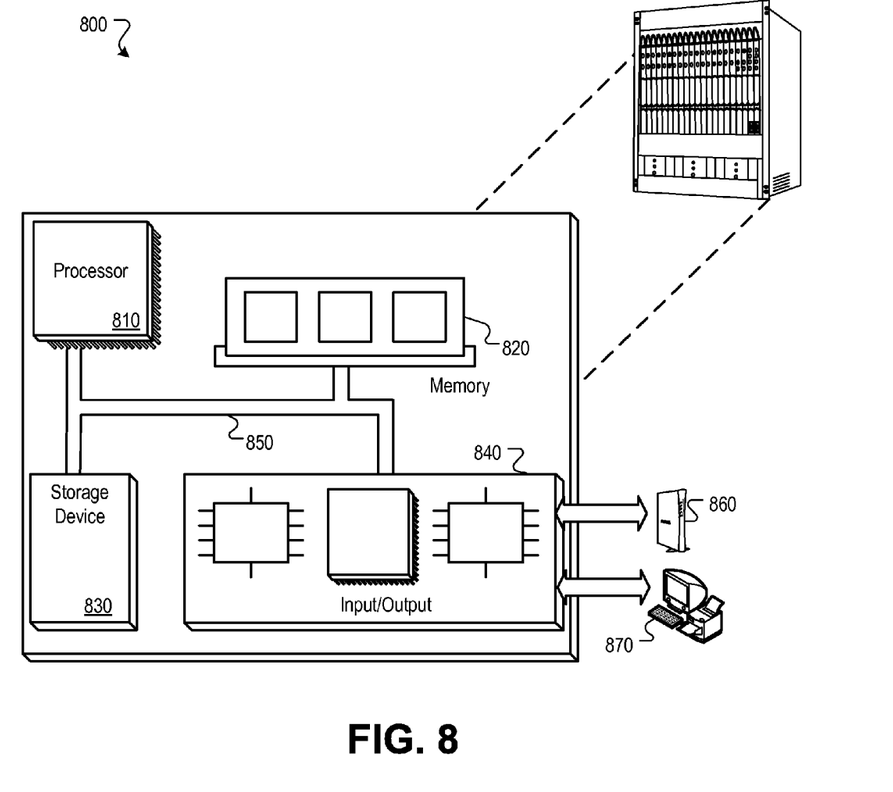
FIG. 8 is a block diagram of a CMTS device operable to provide improved load balancing for network devices.

FIG. 8 is a block diagram of a CMTS device (e.g., CMTS 105 of FIG. 1 and CMTS 205 of FIG. 2) operable to provide cable model load balancing. The improved load balancing for network devices CMTS device 800 can include a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the device 800. In one implementation, the memory 820 is a computer-readable medium. In one implementation, the memory 820 is a volatile memory unit. In another implementation, the memory 820 is a non-volatile memory unit.

In some implementations, the storage device 830 is capable of providing mass storage for the device 800. In one implementation, the storage device 830 is a computer-readable medium. In various different implementations, the storage device 830 can include, for example, a hard disk device, an optical disk device, flash memory or some other large capacity storage device.

The input/output device 840 provides input/output operations for the device 800. In one implementation, the input/output device 840 can include one or more of a wireless interface and various networks and devices 860. In addition, such input/output device 840 can communicate with other external devices through interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., various networks and devices 860 such as, for example, CM/MTA, computing device, among many others), as well as sending communications to, and receiving communications from various networks (not shown).

The device (e.g., a CMTS device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. An improved load balancing system for network devices, comprising:
   a network interface operable to receive an incoming signal comprising a network device identifier and a channel compatibility, wherein the channel compatibility is based upon results of one or more attempts to assign the network device to a channel;
   a storage module operable to store the network device identifier and the channel compatibility;
   a processor operable to generate one or more load groups wherein the load group contains one or more channels and one or more network devices, the processor being further operable to compare the network device identifier and the channel compatibility when determining subsequent attempts to assign a network device to a channel;
   the processor being further operable to instruct the network device to change a channel without rebooting the network device, the channel being based on the comparison between the network device identifier and the channel compatibility; and
   the processor being further operable to update the network device identifier and the channel compatibility based upon results from the subsequent attempts to assign a network device to the channel.

2. The improved load balancing system for network devices of claim 1, wherein the channel compatibility is a count of one or more successful assignments of a network device and a channel.

3. The improved load balancing system for network devices of claim 2, wherein the channel compatibility further comprises time-based information associated with the count of one or more successful assignments of the network device and the channel.

4. The improved load balancing system for network devices of claim 3, wherein the processor module is further operable to delete the network device identifier and the channel compatibility based on the time-based information associated with the count of one or more successful assignments of the network device and the channel.

5. The improved load balancing system for network devices of claim 1, wherein the channel compatibility comprises a count of one or more failed assignments of a network device and a channel.

6. The improved load balancing system for network devices of claim 5, further comprising:
   a user interface operable to establish a failure count threshold, wherein the failure count threshold comprises a number of failed assignments of the network device and the channel, at which point the number of failed assignments is used when determining subsequent attempts to assign a network device to a channel; and
   wherein the channel compatibility further comprises time-based information associated with the count of one or more failed assignments of a network device and a channel.

7. The improved load balancing system for network devices of claim 6, wherein the processor module is further operable to delete the network device identifier and the channel compatibility based on the time-based information associated with the count of one or more failed assignments of a network device and a channel.

8. The improved load balancing system for network devices of claim 1, wherein the channel compatibility further comprises time-based information associated with the channel compatibility.

9. The improved load balancing system for network devices of claim 8, wherein the processor module is further operable to delete the network device identifier and the channel compatibility based on the time-based information associated with the channel compatibility.

10. A computer implemented method comprising:
    forming a plurality of load groups based on a network device characteristic associated with one or more of a plurality of channels;
    wherein the network device characteristic associated with the one or more of the plurality of channels comprises one or more tables, wherein the one or more tables comprise results of one or more attempts to assign the network device to the one or more of the plurality of channels;
    storing the network device characteristic in a data store; and
    comparing the network device characteristic in determining subsequent network device attempts to assign a network device to the one or more of the plurality of channels.

11. The computer implemented method of claim 10, wherein the network device characteristic is based on one or more successful attempts to assign a network device to the one or more of the plurality of channels.

12. The computer implemented method of claim 11, wherein the network device characteristic further comprises time-based information associated with network device attempts to assign to one or more of the plurality of channels.

13. The computer implemented method of claim 10, wherein the network device characteristic is based on one or more failed attempts to assign a network device to the one or more of the plurality of channels.

14. The computer implemented method of claim 13, wherein the network device characteristic further comprises time-based information associated with network device attempts to attach to a channel.

15. The computer implemented method of claim 10, wherein the stored network device characteristic is removed after a period of time.

16. A computer implemented method comprising:
    reallocating network devices from a higher-load group channel to one or more lower-load group channels based upon compatibility characteristics associated with one or more network devices and one or more of a plurality of channels;
    wherein the compatibility characteristics comprise one or more tables, wherein the one or more tables comprise results of one or more attempts to reallocate a network device to a channel from the one or more lower-load group channels; and
    comparing the compatibility characteristics in subsequent network device attempts to reallocate a network device to the channel when reallocating a load group.

17. The computer implemented method of claim 16, wherein each of the compatibility characteristics comprises a threshold count.

18. The computer implemented method of claim 17, wherein a network device reallocation to the channel is skipped based on the threshold count.

19. The computer implemented method of claim 17, wherein the threshold count is modified based on a successful network device attachment to the channel.

20. The computer implemented method of claim 17, wherein the threshold count is modified based on a failed network device attachment to the channel.

* * * * *